May 11, 1954

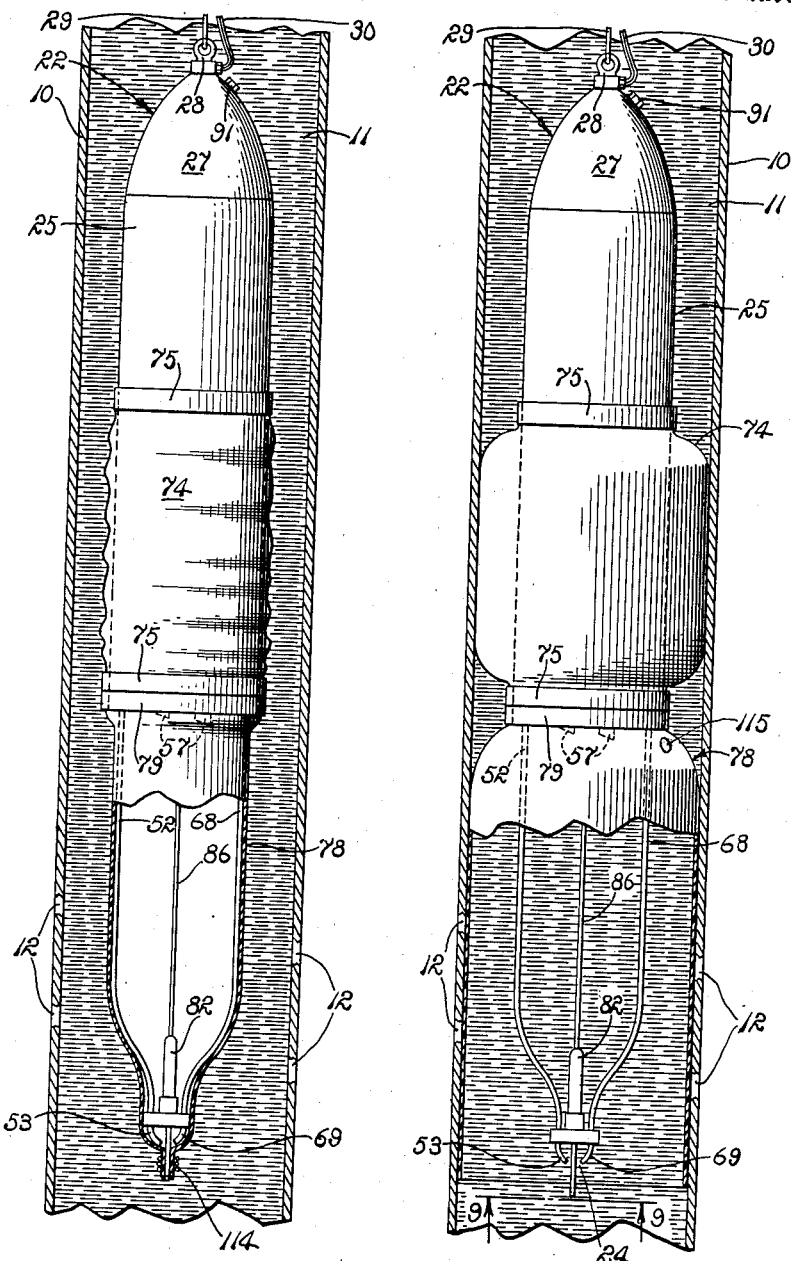

C. LAVAL, JR 2,677,996

BOREHOLE CAMERA APPARATUS

Filed Nov. 19, 1951

CLAUDE LAVAL, JR.
INVENTOR

HUEBNER, BEEHLER,
WORREL & HERZIG
ATTORNEYS

BY

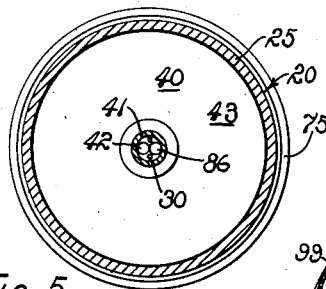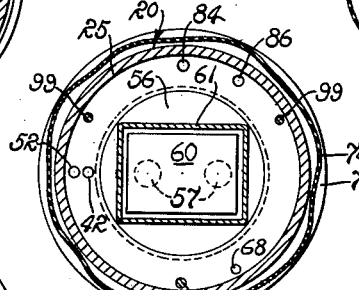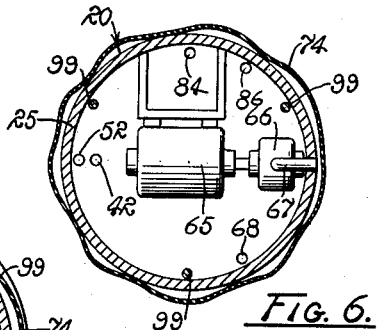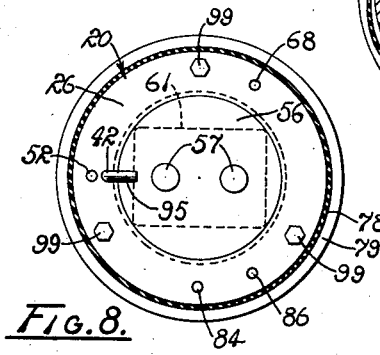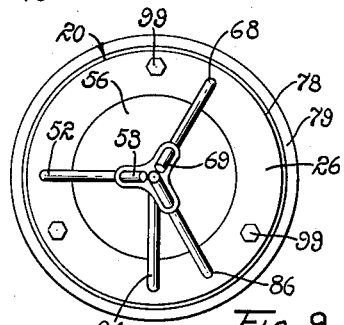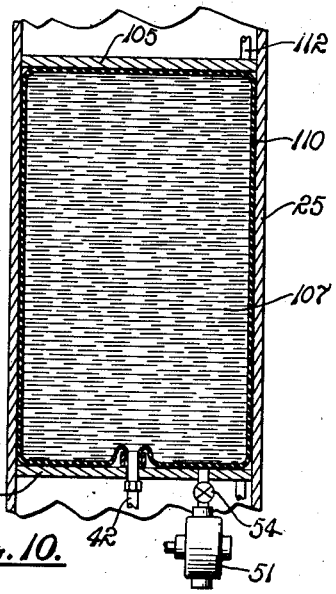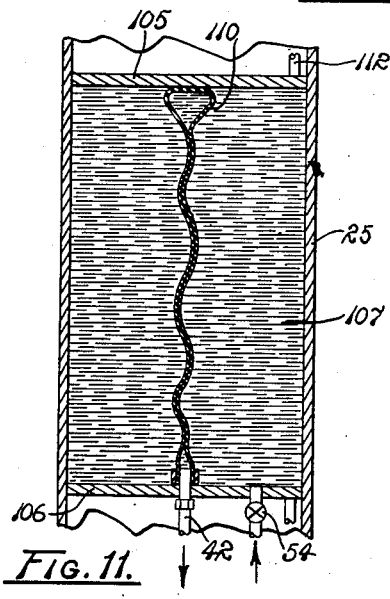
CLAUDE LAVAL, JR.
INVENTOR
HUEBNER, BEEHLER,
WORREL & HERZIG
ATTORNEYS Patented May 11, 1954

2,677,996

UNITED STATES PATENT OFFICE 2,677,996

BOREHOLE CAMERA APPARATUS

Claude Laval, Jr., Fresno, Calif.

Application November 19, 1951, Serial No. 257,107

27 Claims. (Cl. 95—11)

While the problems incident to subterranean and submarine photography have received considerable attention, their even partial solution sufficient to make such photography practical on a commercial basis has only recently been achieved. Such photography, however, has generally been limited to the photographing of "dry" wells. Unfortunately, the most urgent requirements for careful observation of well casings, well drilling tools, and the like occur at great depths and frequently below the surface of muddy water, oil, drilling mud and other opaque or translucent fluids. The photographic problems incident to such conditions have been of such obvious difficulty that investigation photography below the surfaces of these opaque and frequently viscous fluids has been generally regarded as impossible.

The present invention has made possible the localized substitution of transparent fluids for translucent or opaque fluids, such as drilling mud or the like, even at extreme depths, the retention of the transparent fluid in an area of photographic investigation, and the photographing of the area through the transparent liquid. Not only have the results provided detailed well analysis and the intelligent planning of appropriate corrective measures but such supplanting of a fluid in a well is accomplished without precluding upward movement of fluid in the well, as for pressure dissipation purposes, during the actual photographing operation.

An object of the present invention is to photograph wells and the like below the surfaces of oil, drilling mud, dirty water, and other opaque, translucent, or transparent fluids.

Another object is to provide means for supplanting fluids in wells and the like at predetermined areas of investigation with transparent fluids suited to the transmission of light therethrough.

Another object is to locate and retain transparent fluids below the surfaces of opaque or translucent fluids for photographic purposes.

Another object is to provide a remotely controlled self-contained photographing apparatus adapted to be lowered to a predetermined depth below the surface of an environmental fluid, to supplant a portion of the environmental fluid at a photographic area with transparent fluid, to photograph the area through the transparent fluid, and to withdraw the transparent fluid and replace the environmental fluid at the photographic area.

Another object is to provide an apparatus of the character described in the preceding paragraph adapted to perform the described functions without precluding fluid passage upwardly or downwardly past the apparatus during operation.

Another object is to provide in a photographic apparatus of the character described, a downwardly extended sleeve of transparent material adapted to confine transparent fluid for photographic purposes.

Further objects and advantages will become apparent in the subsequent description in the specification.

In the drawings:

Fig. 1 is a vertical section of a well showing in side elevation suspended therein a photographic apparatus embodying the principles of the present invention.

Fig. 2 is a view similar to Fig. 1 showing the apparatus conditioned to photograph the well. In Figs. 1 and 2 a portion of a shroud of the device is removed for illustrative convenience.

Fig. 5 is a horizontal section through the apparatus taken at the position indicated by line 5—5 of Fig. 3.

Fig. 6 is a horizontal section through the apparatus taken at the position indicated by line 6—6 of Fig. 3.

Fig. 7 is a horizontal section through the apparatus taken at the position indicated by line 7—7 of Fig. 3.

Fig. 8 is a horizontal section through the apparatus taken at the position indicated by line 8—8 of Fig. 3.

Fig. 9 is a bottom view of the apparatus, containing no liquid, as viewed from line 9—9 of Fig. 2, but with its shroud hanging cylindrically from its attachment to the apparatus.

Fig. 10 is a fragmentary vertical section somewhat similar to Fig. 3 illustrating a second form of a transparent fluid reservoir and fluid partitioning means therefor utilized in the apparatus, said partitioning means being distended as for lowering of the apparatus into a well.

Fig. 11 is a view similar to Fig. 10 but showing the partitioning means collapsed as by the supplanting of well fluid by transparent fluid initially contained in the apparatus.

Figure 3:
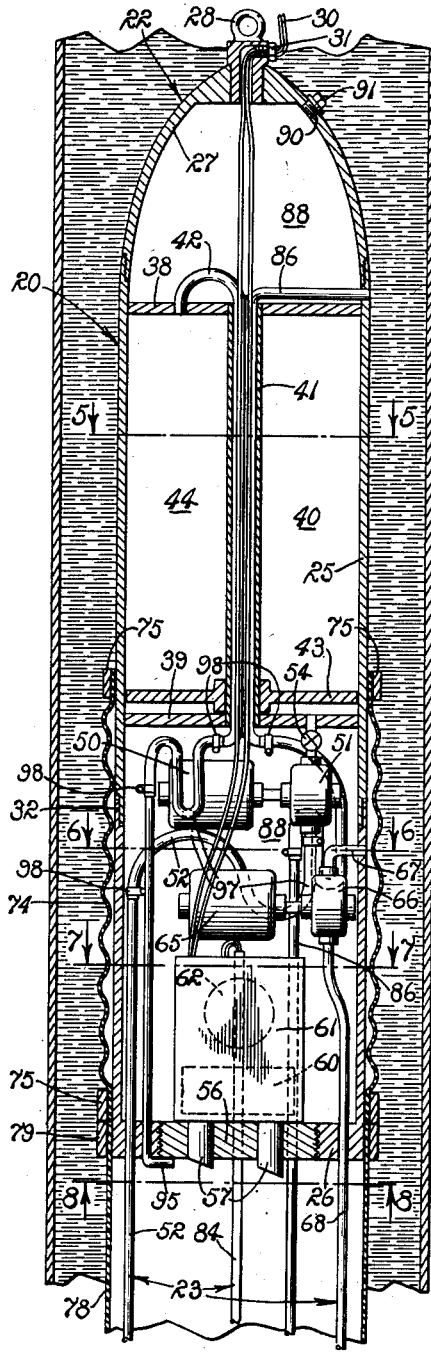
Fig. 3 is a somewhat enlarged, fragmentary, vertical section of the well and photographic apparatus shown in Fig. 1.

Referring in greater detail to the drawings:

An environment suitable to the demonstration of the utility of the present invention is shown in Figs. 1 to 4, including a well casing 10 containing oil or other opaque fluid 11. Inasmuch as perforations in the casing are productive of increased problems, the casing 10 is shown as having perforations 12 in order to demonstrate the solution of the problems incident thereto.

The apparatus provides a housing 20 of steel or other suitable material having adequate strength to resist damage to the mechanisms contained therein, subsequently to be described, during transporting of the apparatus, lowering the same to even extreme depths in oil wells and the like, and retrieving the same from such wells. Although the housing may take many forms, the applicant prefers to employ a shape having a substantially blunt dependent head end 21 and a streamlined upper end 22. A plurality of tubular members 23 are mounted on the head end 21 and endwardly extended therefrom to a point of convergence 24 axially aligned with the housing.

The housing 20 conveniently consists of a hollow, substantially cylindrical body portion 25 of steel pipe or other suitable material. The body provides a lower end having an annular head plate 26 weldably or otherwise secured concentrically thereon. The upper end of the body has a generally bullet or streamlined shaped closure member 27 screw-threadably mounted therein. An eyelet 28 is mounted coaxially of the housing in fluid-tight engagement in the upper end of the closure member 27 for convenience of attachment of a lowering and raising cable 29 thereto. Electrical control cables 30 pass through the eyelet into the housing 20 and fluid passage thereabout is precluded by a packing gland 31 mounted in the eyelet. The control cables 30 are preferably taped to the raising and lowering cable 29, not shown, for convenience in concurrent winding of said cables on the drum of a winch, also not shown. For purposes of assembling convenience, the body portion 25 consists of a pair of axially aligned segments having telescopically interconnected ends, indicated at 32, which are drawn into fluid-tight interconnection in a manner soon to be described with the segments in axial alignment.

A pair of spaced partitions 38 and 39 are weldably or otherwise mounted in axially spaced relation in the body 25 of the housing defining a fluid reservoir 40 therebetween. Each of the partitions is provided with an opening concentrically therein and a hollow tube 41 is weldably or otherwise secured in fluid-tight engagement with the partitions concentrically of the reservoir. The hollow tube provides passage for the control cables 30 and other elements soon to be described from the upper end 22 of the housing 20 downwardly past the reservoir. A discharge conduit 42 is connected to the upper end of the reservoir 40 by extension through the upper partition 38 and is return bent for downward extension through the hollow tube. A piston 43 is slidably mounted on the tube 41 in fitted engagement with the body portion 25 and for free elevational movement in the reservoir. The reservoir is filled above the piston with any suitable transparent fluid 44; gasoline, kerosene, diesel oil, transformer oil, and even water having been found excellently suited to the purpose. The fluid is preferably immiscible with the fluid in the well to be photographed.

An electric motor 50 is conveniently mounted in the body portion 25 of the housing adjacent to the lower partition 39 in driving connection with the reservoir pump 51. The pump is connected to the bottom of the reservoir 40 through the lower partition below the piston 43 and to an intake conduit 52 which is downwardly extended through the head plate 26 and provides an open lower end 53 downwardly spaced from the head plate a distance substantially equal to the maximum vertical photographic range for the apparatus in a well. To preclude draining of the fluid 44 back from the reservoir 40 through the pump 51 and intake conduit 52 a check valve 54 is provided between the pump and the reservoir. Further, it will be obvious that a television camera or other viewing device may be substituted for the camera 60 without departing from the spirit or scope of the present invention.

For assembling convenience a plug 56 is screw-threadably mounted in the head plate 26 in fluid-tight engagement therewith. Any desired number of windows 57 are mounted in the plug. The applicant, however, usually prefers to provide stereoptican views of the portions of the well photographed in order to permit three-dimensional analysis facilitating the planning of appropriate corrective measures and thus usually utilizes a plug 56 having a pair of windows 57 therein. The windows preferably consist of substantially cylindrical blocks of transparent material mounted in fluid-tight engagement in the plug 56 and having ends exteriorly of the plug providing slanted surfaces oblique to their respective longitudinal axes. The slanted surfaces may be planar or curvaceous as desired. The slanted ends facilitate flushing of dirt or other opaque material therefrom and are preferably slanted to the same side of the plug for purposes soon to become apparent.

A camera 60 is mounted on the plug 56 within the housing 20 having lenses, not shown, in alignment with the windows 55. The camera has a photographic range, or focal point, axially endwardly of the housing below the head plate 26 and preferably short of the point of convergence 24 of the tubular members 23. As shown in the drawings, the camera is housed in an inner casing 61 also enclosing an electrical drive mechanism for the camera connected to one of the control cables 30. It will be apparent that the subject invention is not limited to the utilization of any particular kind or type of camera 60 nor drive mechanism therefor but the applicant prefers to employ that described in his copending patent application filed February 13, 1950, Serial No. 144,012. Suffice it to observe that the camera is energized and controlled remotely, from the top of the well, by controlling the electrical energy supply through one of the control cables 30 or other control expedient suitable to the drive mechanism employed.

A bladder inflating motor 65 is mounted in the housing 20 and has driving connection to a pump 66 also mounted in the housing. The pump has a discharge tube 67 connected thereto and radially extended through the body 20. The pump also has an intake tube 68 downwardly extended through the head plate 26 providing an open lower end 69 in downwardly spaced relation to the housing 20. To preclude the leaking of fluid into the housing 20 about the discharge conduit 42, intake conduit 52, and tube 68, the head plate 26 may be welded thereto.

An annular bladder 74 is mounted concentrically on the housing 20 in overlaying relation to the discharge tube 67 as by circumscribing clamps 75 tightened against the body in overlapping relation to opposite ends of the bladder. The bladder conveniently takes the form of a cylindrical member of rubber or other suitable elastic material. In petroleum wells, oil resistant plastic materials that are adequately elastic are preferred to rubber.

A substantially cylindrical, open ended shroud 78 of transparent, flexible, preferably somewhat elastic material is mounted on the housing 20 and downwardly extended therefrom in circumscribing relation to the tubular members 23. The sleeve is preferably formed from regenerated cellulose, cellulose acetate, cellulose acetate butyrate, cellulose propionate, cellulose nitrate, ethyl cellulose, polyvinyl chloride, vinyl chloride copolymers, polyvinylidene chloride, vinyl chloride-vinylidenechloride copolymers, polyvinyl butyral, polyvinyl alcohol (not recommended in water wells), acrylic, polystyrene, polyester allyl, and the like. The material is preferably selected with due regard to the intended operational environment with particular reference to the temperature ranges anticipated and the transparent fluid 44 employed. The material, of course, must not be soluble in the fluid 44 or fluid in the well or otherwise rendered inoperable thereby and preferably is selected to possess substantially the same light transmitting characteristics as the fluid 44. The shroud is conveniently mounted by fitting an end thereof over the periphery of the head plate 26 and by tightening a circumscribing annular clamp 79 thereabout.

An electric lamp 82 providing a suitable source of illumination is mounted on the tubular members 23 in downwardly spaced relation to the head plate 26 and connected to wire 83 threaded through a conduit 84 mounted in the head plate 26 and constituting one of the tubular members 23. The lamp may be continuously energized by connection of the wire 83 to one of the control cables 30 energized by a source of electrical energy, not shown, at the top of the well or the wire 83 may be connected to the drive mechanism 62 of the camera 60 in the manner described in my above identified copending application for illumination only at those instances at which it is desired to expose film in the camera 60. At this point it will be obvious that the intake conduit 52, intake tube 68, and conduit 84 where endwardly extended from the head plate 26 constitute the tubular members 23 and a convenient mounting for the lamp 82 in endwardly spaced relation to the housing 20.

A vent pipe 86 is extended longitudinally through the housing 20 and provides a lowered end extended downwardly below the lamp 82 and tubular members 23 and an upper end open externally of the housing 20 at any convenient location above the bladder 74.

To equalize pressures within and without the housing 20 so as to permit operation at extreme depths, the entire housing is preferably filled with a liquid 88. Although a clear substantially electrically non-conductive liquid is preferred, such as transformer oil, diesel oil, kerosene, or even gasoline or the like, the subject apparatus has operated successfully with the housing filled with water by simply coating the motors 50 and 65, as well as the desired portions of the camera 60 and drive mechanism 62 thereof, with a waterproofing substance. Several suitable waterproofing substances are commercially available and thus their chemical compositions are not described in detail herein.

It will be apparent that, if preferred, the casing 61 may be made fluid-tight so as to exclude all of the liquid 88 from the camera 60 and its drive mechanism 62 but the applicant prefers completely to fill the housing 20 with the liquid so that there are no air pockets and the problems incident to resisting external pressures avoided. A port 90 is provided in the upper end 22 of the housing closed by a removable plug 91. The liquid 88 is conveniently directed into the housing 20 through the port and drained therefrom by inverting the housing, as desired. An opening 92 is formed in the upper end 22 of the housing and a diaphragm 93 of flexible material mounted therein. As the camera is subjected to variations in environmental pressures incident to immersion, slight flexing of the diaphragm equalizes pressures within and without the housing so that rupture or collapse thereof and undue strain on the housing is precluded.

As previously indicated, the discharge conduit 42 is extended downwardly through the hollow tube 41 past the reservoir 40. Said conduit is also passed downwardly through the head plate 26 and is provided with a lower end 95 externally of the head plate 26 directed toward the slanted ends of the windows 57. Discharge of fluid 44 from the reservoir 40 through the conduit 42 thus serves to wash the windows 57 so as to remove dirt, oil or other material therefrom.

Also, as previously indicated, the segments of the body portion 25 of the housing are telescopically interconnected for assembling convenience at 32. To permit separation of the segments, the discharge conduit 42, the intake conduit 52 and the vent pipe 86 are interrupted adjacent to the interconnection 32 and section of flexible hose 97 positioned therein in fluid-tight interconnection of the portions of the interrupted conduits and pipe by clamps 98 tightened thereabout. Headed bolts 99 are extended through the head plate 26 longitudinally of the housing and screw-threadably engaged with the lower partition 39. Tightening of the bolts 99 serves to draw the segments of the body portion 25 into fluid-tight telescopic interconnection. By removing the bolts 99, the segments can be disassociated as permitted by the flexible hoses 97 for attention to any of the elements of the apparatus thus made accessible.

*Second form of reservoir*

The previously described piston 43 is provided for the purpose of segregating opaque or translucent fluid pumped from the well below the housing 20 by the reservoir pump 51 into the reservoir from transparent fluid 44 contained therein. In many operations, no such fluid segregation need be effected, reliance being placed on differences in specific gravities of the fluids. As a precaution, however, the applicant prefers to keep such fluids segregated in the reservoir but is not limited to the use of a piston of the character described.

For example, in Figs. 10 and 11 a suitable substitute for the piston is shown. In Figs. 10 and 11 a fragmentary section of the housing 20 is shown mounting a pair of spaced partitions 105 and 106, similar to the partitions 38 and 39 previously described, defining a cylindrical reservoir 107 therebetween. It will be obvious that reservoirs of other shapes may be utilized without departing from the spirit or scope of the present invention.

The discharge conduit 42 is preferably connected concentrically to the lower partition 106. An elongated envelope 110 of rubber or other suitable elastic material has an upper end preferably vulcanized or otherwise connected to the upper partition 105 and a lower end connected to the discharge conduit 42. The pump 51 is connected to the reservoir 107 through the lower partition 106, as described for the connection thereof to the reservoir 40.

A hollow tube 112 is extended in fluid-tight engagement through the partitions 105 and 106 and provides a passage through the reservoir 107 for the control cables 30 and the vent pipe 86.

As illustrated in Fig. 10, preliminary to the lowering of the apparatus into a well or the like, the envelope 110 is distended by the pumping of any of the suitable transparent fluids 44 into the envelope through the discharge conduit 42 substantially filling the reservoir. The pump 51 connected to the reservoir through the lower partition 106 when driven by the motor 50 while the apparatus is immersed, forces fluid into the reservoir externally of the envelope 110 compressing the envelope and forcing the transparent fluid outwardly through the discharge conduit 42 transversely of the windows 57 and supplants the fluid drawn through the intake conduit 52. The discharge conduit is preferably sufficiently small that no substantial quantities will leak therethrough in absence of operation of the pump 51.

*Operation*

The operation of the apparatus of the present invention is believed to be clearly apparent and is briefly summarized at this point. The camera 60 is loaded with film and any other desired adjustments made therein by removing the plug 56 from the head plate 26. The inner casing 61 is preferably mounted on the inner surface of the plug 56 for convenience in removal for access to the camera 60 and electrical drive mechanism 62. When the desired adjustments have been made, the casing is returned to position on the plug and the plug screw-threadably mounted in fluid tight engagement with the head plate 26.

When it is desired to have access to the motor 50 or 65 and the pumps 51 or 66, the headed bolts 99 are disengaged from the lower partition 39 and the segments of the body portion 25 of the housing telescopically disassociated. The hose sections 97 are disconnected from their respective conduits and pipe by removal of the clamps 98. For operation, the hose sections 97 are connected as shown in Fig. 3, and the segments of the body portion 25 interconnected in fluid tight engagement by tightening the headed bolts 99 into the lower partition 39. If access is desired to the interior of the housing 20 above the reservoir 40, the closure 27 is simply screw-threadably disengaged from the body portion 25.

Preliminary to operation, the reservoir 40 or the envelope 110 in the reservoir 107, is filled with the selected transparent fluid 44. The plug 91 is removed from the port 90 and the entire housing 20 filled with any of the described or other suitable fluids. The lowering and raising cable 29 is connected to the eyelet 28 and appropriate electrical connection made to the control cables 30.

Preliminary to lowering the apparatus into a well or the like, the shroud 78 is preferably drawn downwardly over the tubular members 23 and the lower end thereof releasably tightened about the lower end of the vent pipe 86 as by a rubber band 114.

The housing 20 is lowered into a casing 10 or other bore or the like to a desired depth for photographic investigation. The depth is accurately determined by measuring the extent of cable 29 lowered into the casing 10. During movement of the housing 20 through a fluid 11 contained in a well or the like, the fluid passes by the side walls of the housing and through the vent pipe 86.

Figure 4:
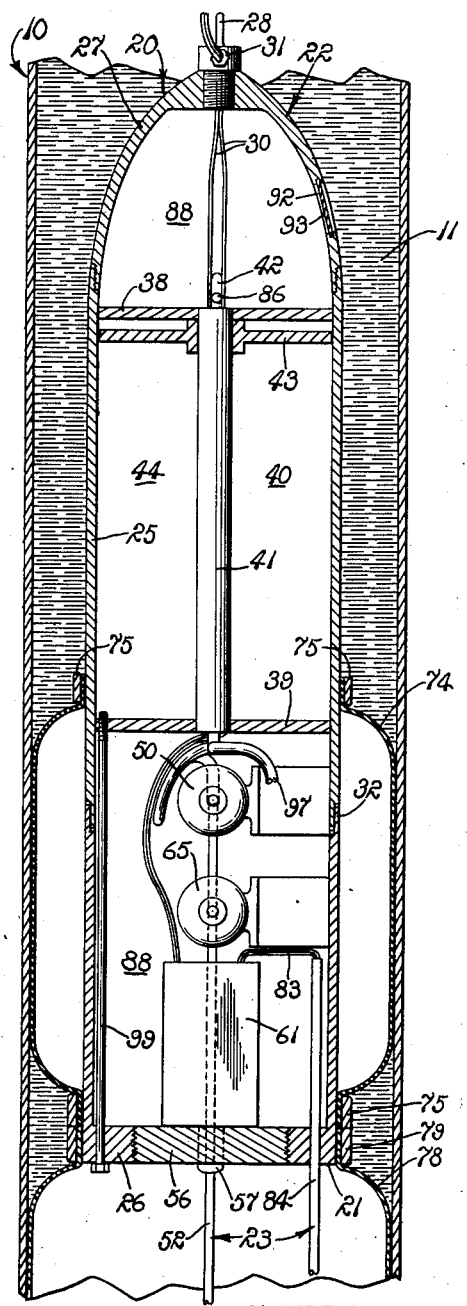
Fig. 4 is a fragmentary vertical section similar to Fig. 3 but in 90° angular relation thereto and showing the apparatus as conditioned in Fig. 2 for photographic operations.

When a desired depth for photographic investigation is reached, the bladder motor 65 is energized by supplying electrical current to the control cable 30 connected thereto. The operation of the pump 66 draws fluid 11 inwardly through the intake tube 68 for discharge through the tube 67 into the bladder 74. The bladder is distended into engagement with the casing 10, as shown in Figs. 2 and 4, providing substantially fluid tight engagement therewith. At this point the operation of the motor 65 may be discontinued if desired, but the applicant prefers to permit continuous operation of the motor during distension of the bladder 74. After engagement with the casing 10, the pump 66 tends to windmill so that the bladder is not excessively inflated but by such windmilling assures continuous pressure to the bladder to assure continuing fluid tight engagement with the casing.

When the bladder 74 has been expanded into casing engagement, the reservoir pump 51 is energized by connecting the control cable 30 thereof to a suitable source of electrical energy, not shown, and by operation of the pump 51 fluid 11 is drawn through the intake conduit 52 and forced into the reservoir 40 (or 107). The fluid 11 pumped into the reservoir forces the piston 43 upwardly (or collapses the envelope 110) forcing the transparent fluid 44 outwardly through the discharge conduit 42 to flush the slanted ends of the windows 57 and replace the fluid 11 drawn inwardly through the conduit 52. So that the transparent fluid 44 remains adjacent to the windows 57, a fluid having a lower specific gravity than the fluid 11 contained in the well or other operational environment is utilized. It will be obvious that the apparatus may be constructed for upwardly directed photography if desired. In such event, the lamp 82 is mounted above the housing, the camera 60 upwardly directed, the bladder 74 provided relatively below the camera, and a fluid 44 of a higher specific gravity than the fluid 11 in the well used to replace the fluid 11 immediately above the housing 20.

Although the lower end of the shroud 78 is closed for lowering into a well, such closing is only for the purpose of holding the shroud in a downwardly extended position during lowering operations. The shroud is preferably provided with an opening 115 so that during the lowering of the apparatus, air trapped within the shroud is bled therefrom and fluid 11 contained in the well passes into the shroud. During the described pump operation to supplant fluid 11 below the housing 20 with the transparent fluid 44, the shroud usually tends to move upwardly because of the lower specific gravity of the fluid 44 and by such movement releases the lower end thereof from the rubber band 114. As shown in Fig. 2, the shroud expands into engagement with the casing 10 and overlays the perforations 12. It is to be understood that the shroud is not necessary to operation of the apparatus of the present invention but is a useful expedient in retaining the transparent fluid 44 in desired photographic position particularly where a cross current of fluid 11 passes through the perforations and casing 10.

With the transparent fluid 44 substantially filling the casing 10 below the head plate 26, the control cable 30 connected to the electrical drive mechanism 62 of the camera 60 and the wire 83 connected to the lamp 82 are energized. Any desired number of photographs are taken by the camera which is operated as described in my above identified copending patent application or in any other suitable manner.

When the photographic operation is completed, the operation of the bladder motor 65 is interrupted by disconnecting its respective control cable 30 from the source of electrical energy. The fluid 11 contained by the bladder 74 is thus released from pressure and at least a small flow thereof backwardly through the pump and intake tube 68 expelled, permitting the bladder to contract from casing engagement. During normal operations it was not necessary to draw the transparent fluid 44 from below the housing 20 back into the reservoir 40 (or 107) but if this is desired a reversible motor is utilized at 50 and preliminary to collapse of the bladder the motor reversed to pump the fluid 44 back to the reservoir.

Upon partial collapse of the bladder 74 the apparatus is withdrawn from the casing by means of the cable 29 or moved to successive areas of operation as desired. The apparatus of the present invention has proved satisfactory in photographing wells and the like while submerged in water, oil, drilling mud, and the like and is believed adapted for successful operation in substantially any transparent, translucent or opaque fluid. Operation under extreme pressures as those encountered in depths of thousands of feet in oil wells and the like present no difficulty in that the filling of the housing 20 with a fluid 88 and the operation of the diaphragm 93 readily equalizes pressures internally and externally of the housing. Further, the filling of the housing with a fluid serves to exclude air therefrom so that the high temperatures experienced at great depths do not result in oxidation of film, not shown, utilized in the camera.

The vent pipe 86 permits the passage of liquid and gaseous fluids past the apparatus during operation thereof and thus the difficulties incident to photographing in a flowing well obviated. The described assembly of the apparatus permits the ready disassociation of the parts thereof for cleansing, repair, and/or replacement purposes.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A submersible photographic apparatus comprising an elongated fluid-tight housing, means for lowering the housing into a fluid containing bore, a camera mounted in the housing having a photographic field exteriorly of the housing, a hollow elastic bladder mounted in circumscribing relation on the housing, and pump means within the housing having an intake exteriorly of the housing and the bladder and a discharge within the bladder operable remotely from the housing to pump fluid, in the bore into which the housing is lowered, into the bladder to expand the bladder into engagement with surrounding walls of the bore.

2. In a submersible photographic apparatus for investigating well boreholes and the like while submerged in liquids contained therein, the combination of a hollow liquid-tight housing, a window in the housing, a camera mounted in the housing in alignment with the window, inflatable bladder means mounted in circumscribing relation on the housing in vertically spaced relation to the window for releasably forming fluid-tight interconnection of the housing and the walls of a well borehole into which the apparatus is lowered, a pump within the housing having an intake exteriorly of the housing and the bladder and a discharge within the bladder, control means for the pump operable remotely from the housing, a reservoir within the housing, transparent liquid in the reservoir of a specific gravity distinguished from the specific gravity of liquid in the bore, a second pump within the housing for drawing liquid from the bore externally of the window into the reservoir and supplanting said liquid with the transparent liquid in the reservoir, and control means for the second pump operable remotely from the housing.

3. In a submersible well photographing apparatus, the combination of a substantially liquid-tight housing, a substantially cylindrical transparent shroud of flexible material mounted on the housing and downwardly extended therefrom having an open extended end adapted to receive the liquids of wells in which the camera is submerged, a reservoir of transparent liquid having a lower specific gravity than liquids normally encountered in wells, mounted in the housing and having an outlet within the shroud, a pump mounted in the housing having an intake in downwardly spaced relation to the housing within the shroud and a discharge within the reservoir adapted when actuated to draw liquids, in which the housing is submerged, into the reservoir and to force transparent replacement fluid therefrom into the shroud, control means for the pump operable from exteriorly of the housing, and a camera mounted within the housing directed into the shroud.

4. In a well photographing apparatus adapted to take photographs while submerged in well contained liquids, the combination of a fluid-tight housing, a hollow substantially annular bladder mounted in circumscribing relation on the housing, a pump mounted in the housing adapted to draw liquid from a well in which the apparatus is submerged from below the housing and to force such liquid into the bladder for expansion thereof into engagement with the walls of the well, control means connected to the pump operable remotely from the housing, a transparent window mounted in the housing below the bladder, a camera mounted within the housing in alignment with the window, a reservoir within the housing, a transparent liquid in the reservoir of a lower specific gravity than the liquid of the well, a second pump within the reservoir, an intake conduit connected to the pump having an intake end in downwardly spaced relation to the housing, a delivery conduit interconnecting the pump and the reservoir, a replacement conduit connected to the reservoir and having an outlet exteriorly of the housing below the bladder, a second remote control means connected to the second pump operable remotely from the housing to cause the pump to draw liquid of the well from below the housing and force liquid into the reservoir to displace transparent liquid from the reservoir through the replacement conduit into the well, and movable partitioning means within the reservoir providing separation of the well liquid and transparent liquid in the reservoir.

5. A photographic apparatus as specified in claim 4 in which the movable partitioning means comprises an expansible envelope connected to one of the conduits within the reservoir providing an elastic membrane dividing the transparent liquid from the well liquid in the reservoir.

6. The combination of a photographic apparatus as specified in claim 4 with a substantially cylindrical shroud of elastic transparent sheet material mounted on the housing in circumscribing relation to the window and to the outlet of the replacement conduit and intake end of the intake conduit and having an open lower end.

7. The photographic apparatus of claim 4 in which a vent pipe is extended through the housing providing an open upper end externally of the housing above the bladder and an open lower end in downwardly spaced relation to the housing.

8. A submersible photographic apparatus comprising an elongated fluid-tight housing, means connected to the housing for lowering the housing into a fluid containing bore, a camera apparatus mounted within the housing having a photographic field endwardly of the lower end of the housing, a window mounted in the lower end of the housing in alignment with the camera, a light source mounted on the housing in endwardly spaced relation to the lower end thereof, a hollow annular bladder of elastic material mounted in circumscribing relation on the housing in fluid tight engagement therewith, a tube downwardly extended from the lower end of the housing, a bladder pump connected to the tube and to the bladder adapted to draw fluid through the tube from below the housing and to force such fluid into the bladder, a reservoir in the housing, a discharge conduit connected to an end of the reservoir and extended downwardly from the housing, transparent fluid substantially filling the reservoir, an intake conduit downwardly extended from the housing having an open end in downwardly spaced relation to the lower end of the discharge conduit, and a reservoir pump adapted to draw fluid through the intake conduit from below the housing and to force said fluid into the reservoir and transparent fluid from the reservoir through the discharge conduit into the bore.

9. A submersible photographic apparatus comprising an elongated substantially cylindrical fluid-tight housing having an upper end and a lower end, means connected to the upper end of the housing for lowering the housing into a fluid containing bore, a camera mounted within the housing having a focal point endwardly of the lower end of the housing, a window mounted in the lower end of the housing in alignment with the camera having a downwardly disposed surface slanted obliquely to the longitudinal axis of the housing, a light source mounted on the housing in endwardly spaced relation to the lower end thereof, a hollow annular bladder of elastic material mounted in circumscribing relation on the housing in fluid tight engagement therewith, a tube downwardly extended from the lower end of the housing, a bladder pump connected to the tube and to the bladder adapted to draw fluid through the tube from below the housing and to force such fluid into the bladder, an elongated reservoir in the housing, a discharge conduit connected to an end of the reservoir and extended downwardly from the housing providing a lower end directed transversely of the window, transparent fluid substantially filling the reservoir at the side of the piston toward the connection of the discharge conduit to the reservoir, an intake conduit downwardly extended from the housing having an open end in downwardly spaced relation to the housing, a reservoir pump within the housing connected to the intake conduit and to the reservoir adapted to draw fluid through the intake conduit from below the housing and to force said fluid into the reservoir to force transparent fluid from the reservoir through the discharge conduit for discharge transversely of the window, a cylindrical shroud of flexible transparent material mounted on the lower end of the housing and endwardly extended therefrom in circumscribing relation to the window, conduits, tube and light source, a vent pipe extended longitudinally through the housing having an open upper end externally of the housing above the bladder and an open lower end below the downwardly extended end of the shroud, and means controlled from externally of the housing for operating the bladder pump, the reservoir pump, and the camera.

10. In an apparatus for photographing in fluids contained in bores such as water wells, oil wells and the like, the combination of an elongated hollow substantially cylindrical fluid tight housing having an upper end and a lower end, said housing having a port formed therein; a flexible diaphragm mounted in sealing engagement in the port; an electrically non-conductive transparent liquid substantially filling the housing; means connected to the upper end of the housing for lowering the housing in a substantially erect attitude into such a bore and raising the same therefrom; an electrically operated camera mounted within the housing having a photographic field externally of the housing; a transparent window mounted in the housing in alignment with the camera; a light source mounted on the housing in spaced relation thereto for illumination of an area externally of the housing in alignment with the camera; a hollow annular bladder of elastic material mounted in circumscribing relation on the housing in fluid-tight engagement therewith upwardly of the window; a tube downwardly extended from the lower end of the housing having an open end in downwardly spaced relation to the housing, an electrically operated bladder inflating pump mounted within the housing and connected to the tube and to the bladder; a reservoir in the housing; a discharge conduit connected to an end of the reservoir and extended from the housing providing an end externally of the housing directed transversely of the window; transparent fluid substantially filling the reservoir; an intake conduit downwardly extended from the housing having an open end in downwardly spaced relation to the housing; an electrically operated reservoir pump mounted within the housing connected to the intake conduit and to the end of the reservoir opposite to the connection of the discharge conduit thereto; a transparent shroud of flexible material mounted on the housing in circumscribing relation to the window, conduits, tube and light source; a vent pipe extended longitudinally of the housing having an open upper and externally of the housing above the bladder and an open lower end below the transparent shroud, conduits, tube and light source; and electrical conducting means connected to the bladder pump, the reservoir pump, and the camera extended from the housing for connection to a source of electrical energy remote from the housing.

11. A submersible photographic apparatus comprising an elongated fluid-tight housing, means connected to the housing for lowering the housing into a bore and immersing the housing in fluid contained in the bore, a camera mounted within the housing having a focal point endwardly of the lower end of the housing, a window mounted in the lower end of the housing in alignment with the camera, a light source mounted on the housing in endwardly spaced relation to the lower end thereof, a hollow annular bladder of elastic material mounted in circumscribing relation on the housing, a tube downwardly extended from the lower end of the housing, a bladder pump connected to the tube and to the bladder adapted to draw fluid through the tube from below the housing and to force such fluid into the bladder, a reservoir in the housing, a discharge conduit having an upper end connected to the reservoir and a lower end downwardly adjacent to the housing, a transparent fluid substantially filling the reservoir, an intake conduit downwardly extended from the housing having an open lower end in downwardly spaced relation to the lower end of the discharge conduit, a reservoir pump within the housing connected to the intake conduit and to the reservoir adapted to draw fluid through the intake conduit from below the housing and to force such fluid into the reservoir to displace transparent fluid contained in the reservoir through the discharge conduit, an expansible envelope mounted in the reservoir in fluid communication with one of the conduits providing an elastic membrane intermediate the transparent fluid and fluid drawn from below the housing, and means controlled from externally of the housing for operating the bladder pump, the reservoir pump, and the camera.

12. In a borehole photographic apparatus, an elongated tubular housing, means for lowering the housing into a borehole below the level of fluid contained therein, a camera mounted within the housing having a photographic field exteriorly of the housing, a hollow elastic bladder mounted in circumscribing relation on the housing at a position above the photographic field of the camera, a pump within the housing having an intake exteriorly of the housing and the bladder and a discharge within the bladder, and remote control means for the pump operable from exteriorly of the borehole selectively to start and stop the pump whereby the bladder may be selectively expanded into substantially fluid tight engagement with walls of the borehole and constricted from such engagement to free the camera for movement of the photographic apparatus.

13. In an apparatus for photographing in liquids contained in the bores of water wells, oil wells and the like, the combination of a camera housing, means for lowering the housing into such a bore, an annular hollow expansible bladder mounted in circumscribing relation on the housing; a pump within the housing having an intake exteriorly of the housing and the bladder and a discharge within the bladder, control means operable remotely from the housing to start and stop the pump whereby the bladder may be expanded into substantially fluid tight engagement with the walls of a bore into which the camera housing is lowered, a reservoir of transparent liquid within the housing having a lower end and an upper end, the upper end having an outlet from the housing below the bladder, a second pump within the housing having an intake in downwardly spaced relation to the housing and a discharge connected to the lower end of the reservoir, and control means for the second pump operable remotely from the housing to pump liquid from the bore into which the housing is lowered into the reservoir to force transparent liquid from the reservoir outwardly of the housing below the bore.

14. A remotely controlled apparatus for photographing below liquid levels in boreholes and the like comprising a substantially fluid tight camera housing, a cable connected to the housing for lowering the camera housing into a borehole below the liquid level therein, an annular hollow expansible bladder mounted in circumscribing relation on the housing, an electrically operated pump within the housing having an intake exteriorly of the housing and the bladder and a discharge within the bladder exteriorly of the housing, an electrical control conductor connected to the pump and extended remotely from the housing for connection to a source of electrical energy, a reservoir within the housing having upper and lower end portions, transparent liquid substantially filling the reservoir, an intake conduit connected to an end portion of the reservoir and endwardly extended therefrom providing an open end in spaced relation to the housing, a discharge conduit connected to the end portion of the housing opposite to the intake conduit having an open extended end exteriorly of the housing between the open end of the intake conduit and the bladder, a second electrically operated pump mounted in the intake conduit adapted to draw liquid from the borehole inwardly through the intake conduit and force the same into the reservoir whereby transparent liquid in the reservoir is forced outwardly through the discharge conduit to replace the inwardly drawn borehole liquid, a second electrical control conductor connected to the second pump and extended remotely from the housing for connection to a source of electrical energy, and a camera mounted within the housing having a photographic field exteriorly of the housing adjacent to the open extended end of the discharge conduit.

15. An apparatus for photographing below liquid levels in boreholes and the like comprising a substantially fluid tight camera housing, means connected to the housing for lowering the housing into a borehole, an annular hollow expansible bladder mounted in circumscribing relation on the housing, an electrically operated pump within the housing having an intake exteriorly of the housing and the bladder and a discharge within the bladder, an electrical control conductor connected to the pump and extended from the housing to the top of the borehole for connection and disconnection to a source of electrical energy for the pump, a reservoir within the housing having upper and lower ends, transparent liquid substantially filling the reservoir of a specific gravity less than the liquid in the borehole and immiscible with the liquid in the borehole, an intake conduit connected to the lower end of the reservoir and extended downwardly therefrom providing an open end in downwardly spaced relation to the housing, a discharge conduit connected to the upper end of the reservoir and having an open extended end exteriorly of the housing below the bladder in upwardly spaced relation to the open end of the intake conduit, a second pump mounted in the intake conduit adapted to pump liquid from a position in the borehole in downwardly spaced relation to the housing into the reservoir through the discharge conduit exteriorly of the housing, a check valve in the intake conduit limiting fluid movement therethrough to movement into the reservoir, and an electrical control conductor connected to the second pump and extended from the housing to the top of the borehole for connection and disconnection to a source of electrical energy for said pump.

16. A submersible photographic apparatus comprising an elongated fluid tight housing, flexible means for lowering the housing into a fluid containing bore, a camera mounted in the housing having a photographic field exteriorly of the housing, a hollow annular bladder mounting in circumscribing relation on the housing, a pump within the housing having an intake exteriorly of the housing and the bladder and a discharge within the bladder operable remotely from the housing to pump fluid in the bore into which the housing is lowered into the bladder to expand the bladder into engagement with surrounding walls of the bore, and a vent pipe extended longitudinally through the housing having an open end below the housing and an upper end externally of the housing above the bladder.

17. In a borehole photographic apparatus, an elongated tubular housing, means for lowering the housing into a borehole below the level of fluid contained therein, a camera mounted within the housing having a photographic field exteriorly of the housing, a hollow elastic bladder mounted in circumscribing relation on the housing at a position above the photographic field of the camera, a pump within the housing having an intake exteriorly of the housing and the bladder and a discharge within the bladder, and remote control means for the pump operable from exteriorly of the borehole selectively to start and stop the pump whereby the bladder may be selectively expanded into substantially fluid tight engagement with walls of the borehole and constricted from such engagement to free the housing for movement in said borehole, and a vent pipe mounted longitudinally in the housing having a lower end in downwardly spaced relation to the housing and an upper end exteriorly of the housing above the bladder whereby elevational fluid movement in the borehole is permitted through the photographic apparatus while said apparatus is held in fixed position by engagement of the bladder with the walls of the borehole.

18. An apparatus for photographing below liquid levels in boreholes and the like comprising a substantially fluid tight camera housing, a cable connected to the housing for lowering the housing into a borehole, an annular hollow expansible bladder mounted in circumscribing relation on the housing, an electrically operated pump within the housing having an intake exteriorly of the housing and the bladder and a discharge within the bladder, an electrical control conductor connected to the pump and extended from the housing to the top of the borehole for connection and disconnection to a source of electrical energy for the pump, a reservoir within the housing having upper and lower ends, transparent liquid substantially filling the reservoir of a specific gravity less than the liquid in the borehole, and immiscible with the liquid in the borehole, an intake conduit connected to the lower end of the reservoir and extended downwardly therefrom providing an open end in downwardly spaced relation to the housing, a discharge conduit connected to the upper end of the reservoir and having an open extended end exteriorly of the housing below the bladder in upwardly spaced relation to the open end of the intake conduit, a second pump mounted in the intake conduit adapted to pump liquid from a position in the borehole in downwardly spaced relation to the housing into the reservoir to force transparent liquid from the reservoir through the discharge conduit exteriorly of the housing, a check valve in the intake conduit limiting fluid movement therethrough to movement into the reservoir, an electrical control conductor connected to the second pump and extended from the housing to the top of the borehole for connection and disconnection to a source of electrical energy for said pump, and a vent pipe mounted longitudinally in the housing having an open lower end below the lower end of the intake conduit and an upper end exteriorly of the housing above the bladder accommodating fluid movement longitudinally therethrough relative to the photographic apparatus.

19. A submersible well photographing apparatus comprising a substantially fluid tight housing, means for lowering the housing into a well below the level of fluid contained therein, a hollow annular expandable bladder mounted in circumscribing relation on the housing, a pump within the housing having an intake exteriorly of the housing and the bladder and a discharge within the bladder, remote control means for the pump operable from exteriorly of the well selectively to start and to stop the pump whereby the bladder may be selectively expanded into substantially fluid tight engagement with the walls of the well and pump operation interrupted to collapse the bladder from the walls of the well, a substantially cylindrical transparent shroud of flexible material mounted on the housing and downwardly extended therefrom having an open extended end adapted to receive the fluid of the well into which the housing is lowered, a reservoir of transparent liquid in the housing having a lower specific gravity than the fluid in the well providing an outlet within the shroud, a second pump within the housing having an intake in downwardly spaced relation to the housing within the shroud and a discharge connected to the reservoir, remote control means for the second pump operable exteriorly of the well to pump well fluid from within the shroud into the reservoir to force transparent liquid from the reservoir into the shroud, and a camera mounted within the housing having a photographic field within the shroud.

20. An apparatus for photographing below liquid levels in boreholes and the like comprising a substantially fluid tight camera housing, a cable connected to the housing for lowering the housing into a borehole, an annular hollow expansible bladder mounted in circumscribing relation on the housing, an electrically operated pump within the housing having an intake exteriorly of the housing and the bladder and a discharge within the bladder, electrical control means connected to the pump and extended from the housing to the top of the borehole for connection and disconnection to a source of electrical energy for the pump, a reservoir within the housing having upper and lower ends, transparent liquid substantially filling the reservoir of a specific gravity less than the liquid in the borehole and immiscible with the liquid in the borehole, an intake conduit connected to the lower end of the reservoir and extended downwardly therefrom providing an open end in downwardly spaced relation to the housing, a discharge conduit connected to the upper end of the reservoir and having an open extended end exteriorly of the housing below the bladder in upwardly spaced relation to the open end of the intake conduit, a second pump mounted in the intake conduit adapted to pump liquid from a position in the borehole in downwardly spaced relation to the housing into the reservoir to force transparent liquid from the reservoir through the discharge conduit exteriorly of the housing, a check valve in the intake conduit limiting fluid movement therethrough to movement into the reservoir, electrical control means connected to the second pump and extended from the housing to the top of the borehole for connection and disconnection to a source of electrical energy for said pump, a substantially cylindrical shroud of transparent flexible material mounted on the lower end of the housing in circumscribing relation to the intake and the discharge conduits and having a downwardly extended lower end adapted to admit liquid into which the housing is lowered, and a camera mounted within the housing having a photographic field exteriorly of the housing within the shroud and exteriorly of the shroud through the transparent walls thereof.

21. In an apparatus for producing viewable images of objects in liquids contained in the bores of water wells, oil wells and the like, the combination of: a camera housing; means for lowering the housing into a bore; means mounted in circumscribing relation to the housing having a peripheral portion engageable with the surrounding interior wall of the bore into which the housing is lowered to form a transverse barrier in the annular space between the housing and said interior wall of the bore, to the movement of liquid longitudinally in the said annular space between the housing and the interior wall of the bore; reservoir means connected to the housing for containing a transparent liquid; camera apparatus mounted within the housing having a field of view exteriorly of the housing; and means for removing liquid from the borehole exteriorly of the housing into said reservoir and for simultaneously supplanting the thus removed liquid in said field of view with transparent liquid from the said reservoir means.

22. A photographic apparatus as specified in claim 21 in which a vent pipe is extended through the barrier means as a pressure relief means for the borehole and has an open end externally of the housing above the barrier means and an opposite end in downwardly spaced relation to the housing.

23. In a submersible photographic apparatus for investigating well boreholes and the like while submerged in liquids contained therein, the combination of a hollow elongated housing, means for lowering the housing into such a borehole and raising the same therefrom in substantially constant attitude disposed longitudinally of the borehole, camera apparatus mounted in the housing and directed endwardly therefrom having a photographic field directed endwardly of and externally of the housing, barrier means encircling the housing for forming a barrier around the housing and extending between the exterior of said housing and the interior wall of a borehole into which the photographic apparatus is lowered whereby flow of liquid along said housing past the barrier means may be substantially prevented, reservoir means in the housing, a transparent liquid in the reservoir means, and means for interchanging liquid in such a borehole endwardly of the housing in the photographic field of the camera apparatus and the transparent liquid in the reservoir means, said transparent liquid being of a specific gravity substantially different from the specific gravity of the liquid in the borehole whereby such liquid delivered into the photographic field is lodged therein against the barrier means.

24. A photographic apparatus as specified in claim 23 in which a vent pipe is extended through the housing as a means for relieving differential pressure longitudinally of the borehole across the barrier open to the exterior of the housing in elevationally spaced relation to the barrier means opposite to the photographic field of the camera apparatus therefrom and an opposite end open to the exterior of the housing in elevationally spaced relation to the photographic field of the camera apparatus on the opposite side of the barrier means from the first-mentioned end.

25. In a submersible photographic apparatus for investigating well boreholes and the like while submerged in liquids contained therein, the combination of: a hollow liquid-tight housing; transparent means extending through the wall of said housing; camera apparatus mounted in said housing in position to receive an image through said transparent means of objects exterior thereto; means encircling said housing for forming a barrier around said housing and extending transversely between the surrounding exterior of said housing and the interior wall of a borehole into which said apparatus is lowered, whereby flow of liquid along said housing past said barrier longitudinally of said borehole may be substantially prevented; reservoir means connected to said housing for containing a transparent liquid; and means for removing liquid from such borehole in the vicinity of and exteriorly of the said transparent means and into said reservoir means and for simultaneously supplanting the thus removed liquid with transparent liquid from said reservoir means.

26. In a submersible photographic apparatus for investigating well boreholes and the like while submerged in liquid contained therein, an elongated hollow housing, means for lowering the housing longitudinally into a borehole below the level of liquid contained therein, camera apparatus mounted in the housing and directed endwardly therefrom having a photographic field externally of the housing, barrier means mounted in circumscribing relation on the housing resiliently expansible into engagement with the interior wall of a borehole into which the photographic apparatus is lowered whereby flow of liquid along said housing past the barrier means is substantially prevented, reservoir means within the housing, a transparent liquid in the reservoir means, means in the housing for exchanging liquid in the borehole externally of the housing in the photographic field with transparent liquid in the reservoir, said transparent liquid being of a specific gravity distinguished from the specific gravity of the liquid in the borehole whereby such liquid delivered into the photographic field is lodged therein against the barrier means, and remote control means for the camera apparatus and the liquid exchange means operable from exteriorly of the borehole successively to replace the liquid of the borehole in the photographic field with the transparent liquid and to operate the camera apparatus.

27. An apparatus for photographing below liquid levels in boreholes and the like comprising a camera housing, means connected to the housing for lowering the housing into a borehole, annular resiliently expansible means encircling the housing for forming a barrier around said housing and extending between the exterior of the housing and the interior wall of a borehole into which the apparatus is lowered whereby flow of liquid along the housing past the barrier may be substantially prevented, reservoir means within the housing adapted to contain transparent liquid of a specific gravity less than the liquid in the borehole and immiscible with the liquid in the borehole, said reservoir means having an inlet port in fluid communication with the liquid in the borehole below the housing, a conduit connected to the reservoir means and extended downwardly therefrom providing an open end in downwardly spaced relation to the housing, means for interchanging liquid in the borehole beneath the housing with transparent liquid in the reservoir means by motivating transparent liquid from the reservoir means downwardly through the conduit and liquid in the borehole from below the housing into the inlet port, movable partitioning means within the reservoir means separating transparent liquid therein from borehole liquid received through the inlet port, and means for controlling the liquid interchanging means remotely from the housing.

References Cited in the file of this patent

UNITED STATES PATENTS

| Number | Name | Date |
|---|---|---|
| 1,658,537 | Reinhold | Feb. 7, 1928 |
| 1,727,495 | Wappler | Sept. 10, 1929 |